Sept. 12, 1939.                W. S. STOCKTON                    2,173,047
                             VEHICLE TRAFFIC SIGNAL
                              Filed Oct. 19, 1937        2 Sheets-Sheet 1
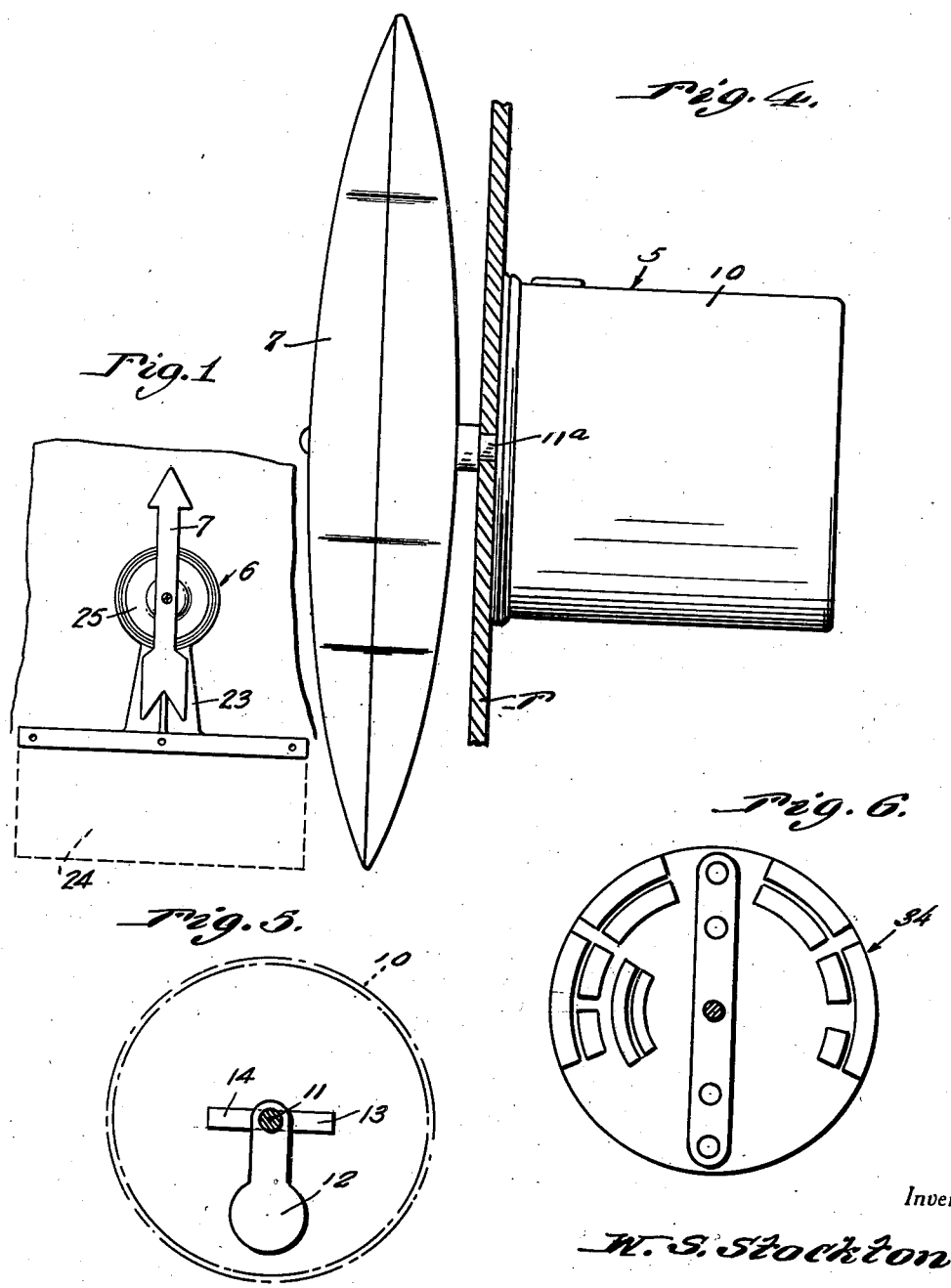
Inventor
W. S. Stockton
By Clarence A. O'Brien
   Hyman Berman
                                                              Attorneys Sept. 12, 1939.  W. S. STOCKTON  2,173,047
VEHICLE TRAFFIC SIGNAL
Filed Oct. 19, 1937  2 Sheets—Sheet 2
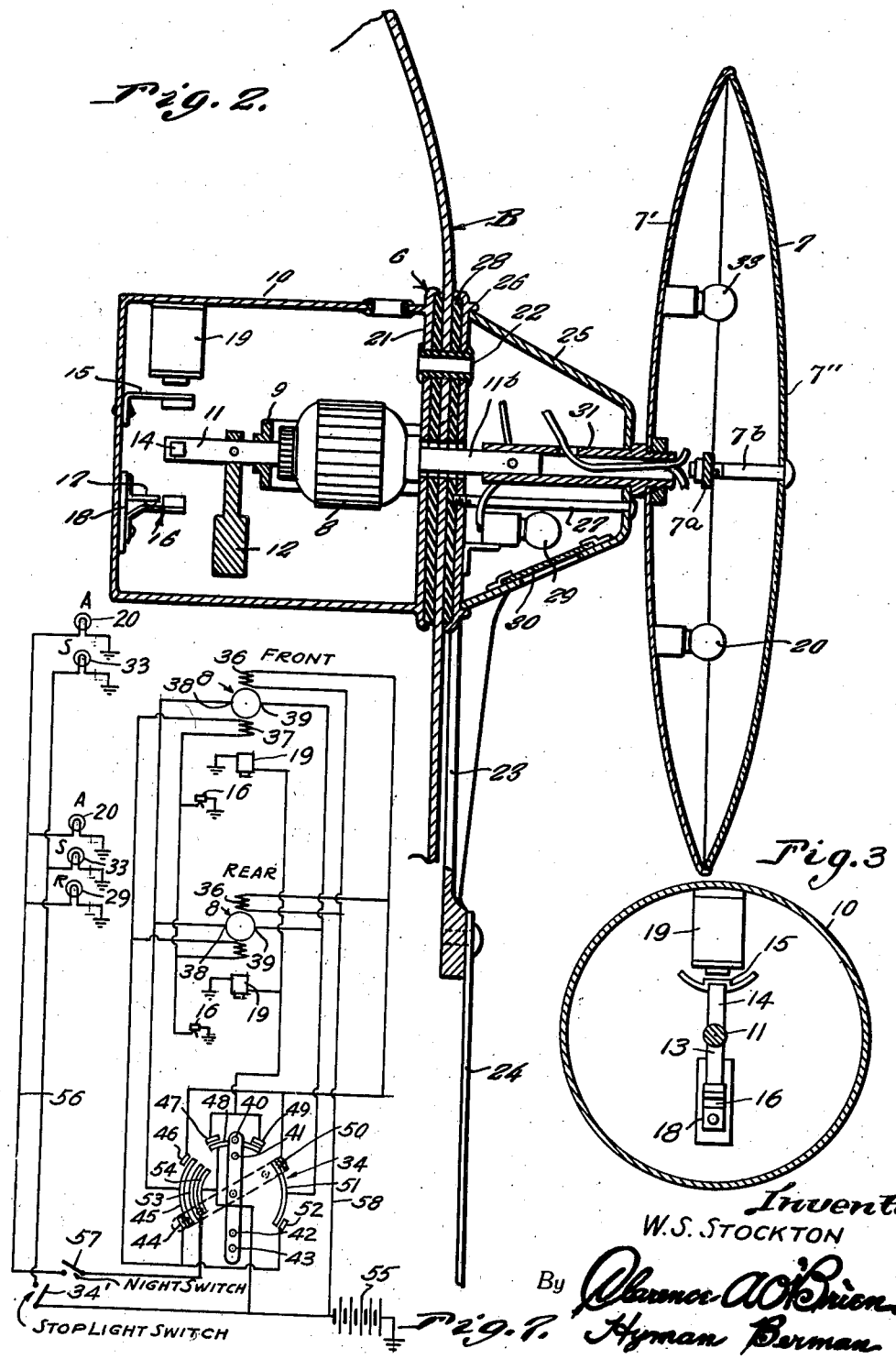
Inventor:
W. S. STOCKTON
By Clarence A. O'Brien
Hyman Berman
Attorneys Patented Sept. 12, 1939

2,173,047

UNITED STATES PATENT OFFICE 2,173,047

VEHICLE TRAFFIC SIGNAL

Walter S. Stockton, Louisville, Ky.

Application October 19, 1937, Serial No. 169,897

2 Claims. (Cl. 177—327)

This invention relates to vehicle traffic or direction signals and more particularly to such a signal having a pointer for indicating the contemplated movement of the vehicle.

An object of the present invention is to improve generally upon the construction, combination and arrangement of parts of such a signal; and the invention together with its objects and advantages will be best understood from a study of the following description taken in connection with the accompanying drawings, wherein:

Figure 1 is an elevational view of the rear signal.

Figure 2 is a vertical sectional view through the rear signal.

Figure 3 is a sectional view illustrating certain details in construction hereinafter more fully referred to.

Figure 4 is a side elevational view of the front signal.

Figure 5 is a detail view showing a section through a motor shaft with a weight thereon and also with the bar thereon.

Figure 6 is a detail view of a control switch.

Figure 7 is a wiring diagram of the signal circuit.

Referring to the drawings more in detail it will be seen that in accordance with the present invention there is provided a direction signal 5 adapted to be mounted at any suitable and convenient location on the front of the automobile and a signal 6 adapted to be mounted at any suitable and convenient location on the rear of the automobile.

In accordance with the present invention signals 5 and 6 have many structural features in common, each of said signals including a hollow signalling element 7 in the form of an arrow and driven from an electric motor 8.

Electric motor 8 is supported through the medium of a suitable bracket structure 9 within a housing 10.

The electric motor 8 is of the reversible type and has a shaft end 11 to which is suitably secured a weight 12 that acts to normally hold the signal element 7 in a vertical or perpendicular position.

Also on the end 11 of the motor shaft there is provided a cross arm 13 one end of which is adapted to engage with the keeper end 14 of a retaining spring 15 suitably mounted on an end wall of the casing 10 when the signal is pointing to the right or left, and when the parts are in this position the other end of the cross arm is in engagement with a spring contact 16 that is complemental to a contact 17 as shown in Figure 2, contacts 16 and 17 being suitably mounted on and insulated from the walls of the casing 10 as at 18.

The keeper spring 15 also functions as an armature complemental to an electro-magnet 19 suitably mounted within the casing 10 and adapted, when excited, to attract the armature 15 thereby releasing the motor shaft 11 to permit shaft 11 to be partly rotated by the weight 12 to return the signal to inoperative position.

As shown in Figure 4, the casing 10 of the signal element 5 is suitably mounted on some fixed part F of the automobile at the front thereof and the signal element 7 of the signal assembly 5 is suitably mounted on an end 11a of the motor shaft.

As shown best in Figure 2 the casing 10 of the rear signal assembly 6 is suitably mounted on a fixed part B of the automobile at the rear thereof, and in each signal assembly there is interposed between one end of the casing 10 and the part of the automobile on which the casing is mounted a plate 21 of rubber or other suitable material.

As shown in Figure 2 casing 10 of the signal assembly 6 is secured to the part B of the automobile through the medium of rivets 22, which rivets also serve to secure to the part B of the automobile at the side of the part B opposite to the casing 10 a bracket 23 to which is fastened the license plate 24 of the automobile. Mounted on the upper end of the bracket 23 and in substantial alinement with the casing 10 of the signal assembly 6 is a rear lamp casing 25.

The casing 25 is of somewhat frusto-conical form and is opened at its largest end.

The casing 25 is secured to the bracket 23 by disposing the largest end of the casing against the upper portion of the bracket 23 which latter at said upper end is provided with a continuous flange 26 which receives within the confines thereof the said end of the casing 25 as shown in Figure 2. Casing 25 is secured to the bracket 23 through the medium of bolts 27.

Also interposed between the upper portion of the bracket 23 of the part B of the automobile is a spacer 28 of rubber or other suitable material.

Suitably mounted within the casing 25 is a tail-light bulb 29 that is disposed directly behind a window 30 through which the light from the bulb will shine to illuminate the license plate 24.

The shaft of the motor 8 forming part of the signal assembly 6 has an end 11b extending into the lamp casing 25 and on said shaft end 11b is secured a hollow tubular shaft 31 that extends through the end of the casing 25 farthest remote from the bracket 23 and has mounted on the extended end thereof the indicating element 7 of the aforementioned signal assembly 6.

Also in the signal elements 7 of the devices 5 and 6 there are mounted the stop-light bulbs 33 that are connected in circuit with the stop-light switch 34' that is suitably connected with the brake pedal (not shown) of the automobile so that upon application of the brakes by the depressing of the brake pedal the circuit will be closed through the stop-light bulbs 33 thereby illuminating the signal elements 7, and with the signal elements 7 thus illuminated the signals will indicate "Stop".

Each signal 7 is composed of a metal back member 7' with a transparent front member 7" suitably connected at its edges to the edges of the metal member, and a cross bar 7a is carried by the metal member and receives the inner end of a bolt 7b which passes thru the center of the glass member.

The control switch 34 comprises a dielectric casing mounted in the driving compartment of the automobile and having a series of concentric contact strips and a dielectric switch arm pivoted at the center thereof and provided with contact buttons for bridging concentrically spaced ones of said contact strips.

Referring to Figure 7 of the drawings comprising a wiring diagram of the circuits controlled by the switch 34 this shows the switch arm 35 in position to effect operation of the switch for effecting a left turn indicating position of the two signals 7, each of which comprises a respective motor 8 involving a pair of field coils 36, 37 and a pair of commutator brushes 38, 39, respectively.

The switch arm 35 is dielectric and has distributed therealong from top to bottom the respective bridging contacts 40, 41 and 42, 43 above and below its pivot. The contact 40 is arranged for bridging the paired contact strips 44 and 45, 45 and 46, 47 and 48, 48 and 49, 50 and 51, 51 and 52, according to the position of the switch arm. The switch arm contact 41 is, similarly, arranged to bridge the paired contact strips 53 and 54 when in appropriate position. The switch arm contacts 42 and 43 are arranged to bridge the paired contact strips diametrically opposite those bridged by the switch arm contacts 40 and 41.

With the switch arm 35 in the position illustrated in dotted lines in Figure 7 wherein the signals 7 indicate a left turn, the switch arm contact 42 is bridging the contact strips 53 and 54, the contact 43 is bridging the contact strips 44 and 45, and the contact 40 is bridging the contact strips 50 and 51. The arrangement connects the ungrounded side of the car battery 55, through the contact strips 53 and 54 to the line 56 leading to the signal illuminating bulbs 20, supposing the night switch 57 to be closed. In this same position of the switch arm the bridging of the contact strips 44 and 45 by the contact 43 connects the ungrounded side of the field coils 37 of the motors 8 with the commutator brushes 38 of the motors, so that the current flows through the commutator, via the brushes 39 to the contact strip 51. The contact strips 51 and 50 being bridged in the stated position of the switch arm, the current passes from the contact strip 51, through the contact strip 50 to one end of the field coils 36 of the motors 8 and return via the wire 58 to the ungrounded side of the battery 55 thereby causing the armatures of the motors 8 to rotate in a left hand direction and turn the signals 7 from a vertical to a horizontal left-pointing position. As the left-pointing position is reached the normally closed grounding arrangements 16 are opened by the cam device 13 on the shaft of the motors, the motors 8 thereby becoming disconnected from the battery 55 so that the signals 7 are halted in the left-pointing position. The magnets 19 operate when energized to lift the latches 15 (see Figures 2 and 3) which hold the cam arrangements 13 in an unoperated position of the signals 7 to free the motor shafts for turning. Energization of the magnets 19 is achieved by moving the switch arm 35 out of the vertical position shown in Figure 7 toward the left or toward the right sufficiently to cause the contact 40 to bridge either the contact strips 48 and 49 or 48 and 47, the former being the contact strips bridged by the switch arm contact 40 in manipulating the switch arm toward the left-turn position illustrated in Figure 7.

It is apparent that in the right-turn position the switch arm 35 has its contact 40 in bridging relation to the contact strips 45 and 46, its contact 41 in bridging relation to the contact strips 53 and 54, and its contact 42 in bridging relation to the contact strips 51 and 52. The bridging of the contact strips 51 and 52, 45 and 46 instead of the contact strips 45 and 44 and 51 and 50 sends the current through the opposite commutator brushes 38 with the result that the motor armatures are reversed and hence the signals 7 are rotated in the opposite direction from that described above or into the right-pointing position.

With the night switch 57 open, as in daylight, the signal illuminating bulbs 20 and tail-light bulbs 29 will remain energized in any operation of the system and with the night switch 57 closed will be energized only while the switch arm 35 is stopped in or is moving in either a right turn or left turning signal operating position. The stop signal bulbs 33 operate every time the stop light switch 34' is closed.

Having thus described the invention what is claimed as new is:

1. A directional signal for motor vehicles comprising a casing, a shaft rotatably supported in the casing and having one end projecting therefrom, a pointer connected with the projecting end of the shaft, means attached to the shaft for yieldingly holding the same with the pointer in inoperative position, a reversible electric motor for rotating the shaft, a cross bar on the shaft within the casing, a latch member for engaging one end of said cross bar when the motor has moved the shaft a quarter turn, said latch member acting to hold the parts in this quarter turned position, a motor circuit, a switch in said circuit for closing the same, a switch for breaking the circuit of the motor, moved to circuit breaking position by the other end of the cross bar when the first end is engaging with the latch member, and magnetic means for releasing the latch member from the cross bar to permit the first mentioned means to move the parts to inoperative position.

2. A direction signal for motor vehicles comprising a casing, a shaft rotatably arranged therein and having one end projecting therefrom, a pointer connected with the projecting end of the shaft, a reversible motor for rotating the shaft, means connected with the shaft for yieldingly holding the parts normally in inoperative position, a cross bar connected with the shaft, a latch member engaging one end of the cross bar when the motor has turned the shaft a quarter turn, a normally closed switch in the motor circuit and opened by the opposite end of the cross bar when the first end is engaging the latch member, magnetic means for moving the latch member out of engagement with the cross bar, and switch means for first closing the circuit to the motor and then actuating the magnetic means.

WALTER S. STOCKTON.